United States Patent [19]

Shinagawa

[11] Patent Number: 5,276,903
[45] Date of Patent: Jan. 4, 1994

[54] METHOD FOR REWRITING PARTIAL PROGRAM DATA IN AN IC CARD AND APPARATUS THEREFOR

[75] Inventor: Toru Shinagawa, Toride, Japan

[73] Assignee: Hatachi Maxell, Ltd., Osaka, Japan

[21] Appl. No.: 3,945

[22] Filed: Jan. 19, 1993

Related U.S. Application Data

[63] Continuation of Ser. No. 391,983, Aug. 10, 1989, abandoned.

[30] Foreign Application Priority Data

Aug. 12, 1988 [JP] Japan .................................. 63-201218
Aug. 12, 1988 [JP] Japan .................................. 63-201219

[51] Int. Cl.$^5$ ............................................. G06F 12/06
[52] U.S. Cl. .................................... 395/800; 395/375; 395/425; 364/DIG. 2; 364/929.4; 364/946.2; 364/970; 364/964.1; 235/380
[58] Field of Search ............. 395/800, 725, 375, 425; 235/379, 380, 381, 382, 487, 492

[56] References Cited

U.S. PATENT DOCUMENTS

| | | | |
|---|---|---|---|
| 4,634,848 | 1/1987 | Shinohara et al. | 235/379 |
| 4,734,568 | 3/1988 | Watanabe | 235/380 |
| 4,746,787 | 5/1988 | Suto et al. | 235/379 |
| 4,803,351 | 2/1989 | Shigenaga | 235/492 |
| 4,816,653 | 3/1989 | Anderl et al. | 235/382 |
| 4,829,169 | 5/1989 | Watanabe | 235/492 |
| 4,849,614 | 7/1989 | Watanabe et al. | 235/379 |
| 4,885,788 | 12/1989 | Takaragi et al. | 235/382 |
| 4,901,276 | 2/1990 | Iijima | 395/800 |
| 4,924,075 | 5/1990 | Tanaka | 235/380 |

*Primary Examiner*—Lawrence E. Anderson
*Assistant Examiner*—Mehmet Geckil

[57] ABSTRACT

A method and apparatus for storing and rewriting programs in an IC card. The system provides for storing programs in subdivided portions identified by attribute information including a program number, size and address. The system enables the rewriting of constituent elements of programs without the need for rewriting larger portions. The information identifying the programs parts is stored in an attribute information table in which said sub-area discrimination information and said management information are stored in combination.

9 Claims, 3 Drawing Sheets

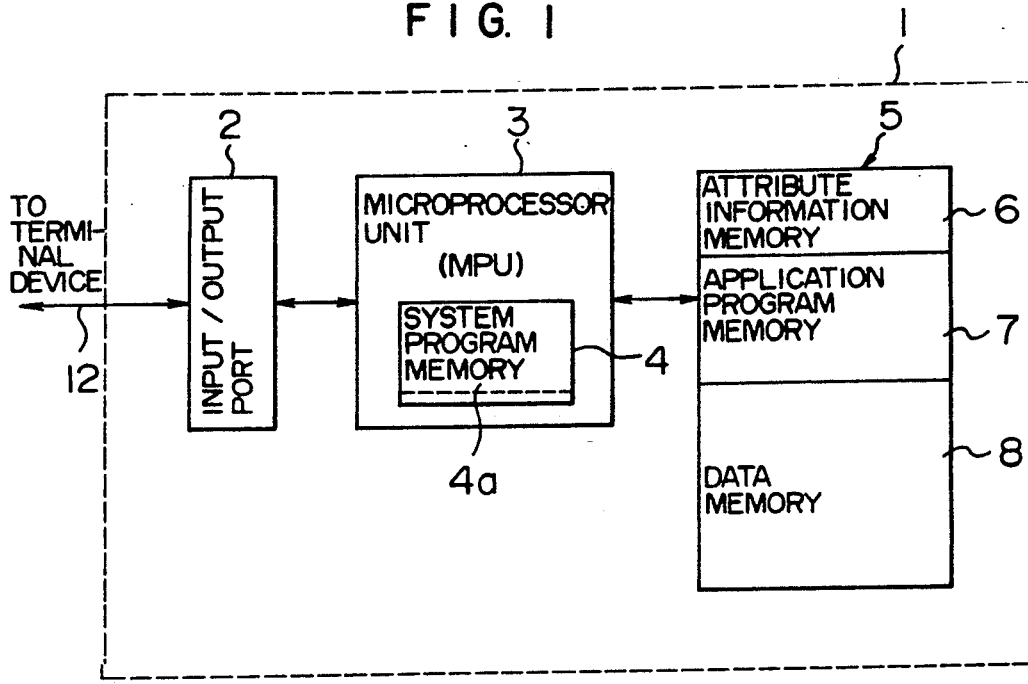
FIG. 1
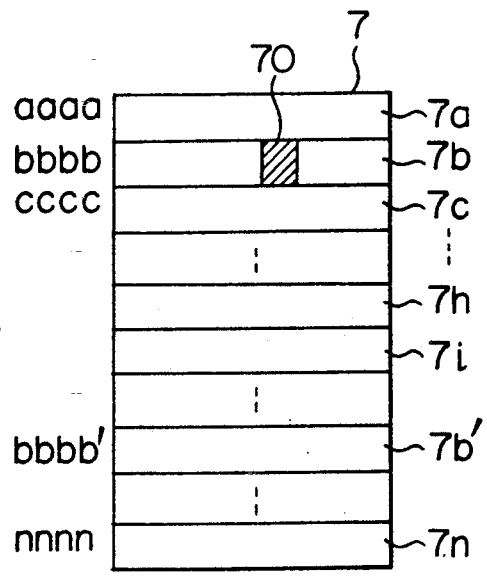
FIG. 2a
FIG. 2b

FIG. 4a
| PROGRAM NO. | AREA NO. |
|---|---|
| A | 1,2,3,----,10 |
| B | 21,---- |
| C | 31,---- |
| D | 41,---- |
9
FIG. 4b
| PARTIAL PROGRAM MEMORY AREA NUMBER (SUBAREA) | TOP ADDRESS | SIZE |
|---|---|---|
| a | aaaa | AA |
| b | bbbb | BB |
| ⋮ | ⋮ | ⋮ |
| n | nnnn | NN |
61
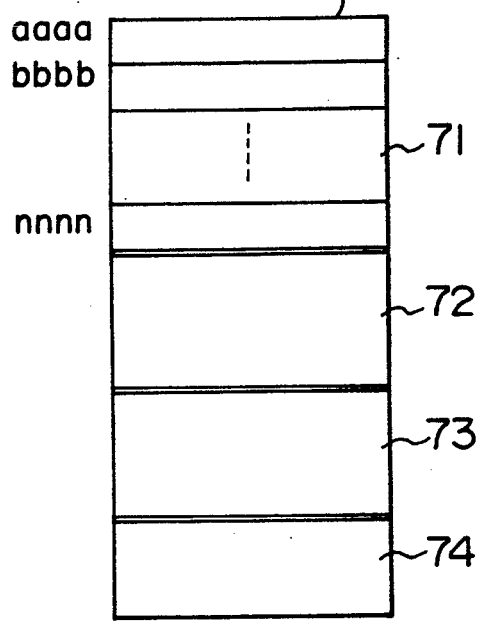
FIG. 4c
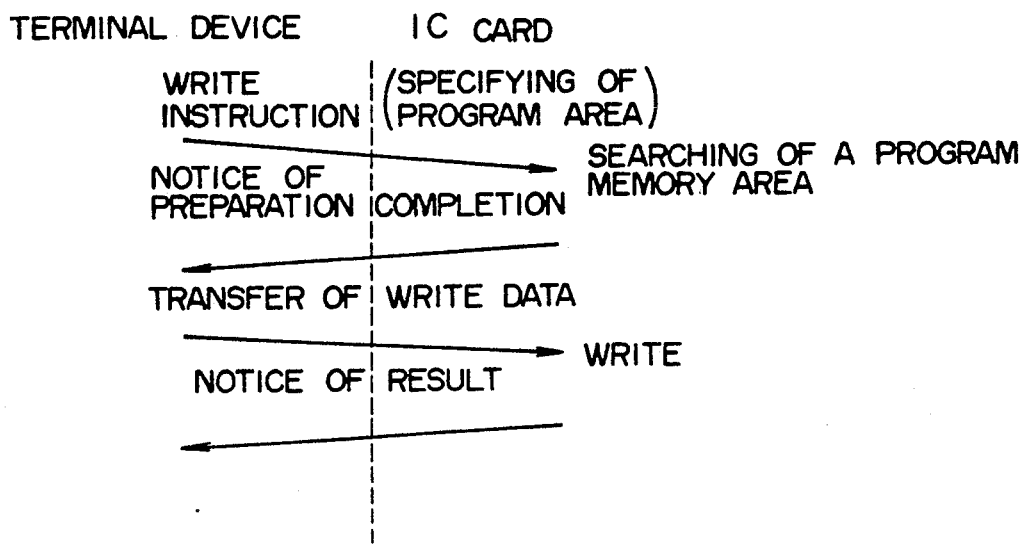
FIG. 5  PROGRAM WRITE SEQUENCE

METHOD FOR REWRITING PARTIAL PROGRAM DATA IN AN IC CARD AND APPARATUS THEREFOR

This application is a continuation of application Ser. No. 07/391,983, filed on Aug. 10, 1989, now abandoned.

CROSS-REFERENCE TO RELATED APPLICATIONS

The present invention is related with U.S. patent application Ser. No. 304,600 filed by T. Shinagawa on Feb. 1, 1989.

BACKGROUND OF THE INVENTION

The present invention relates to an IC card and a method for rewriting its program, and more particularly to a down-loadable IC card which is capable of rewriting its program quickly and a method for rewriting its processing program.

'IC cards' are now being used in a wide variety of applications. The IC cards used to process several kinds of transactions store individual data contents to be processed by different processing procedures. Therefore, the processing programs for the IC cards are unique to the terminals or host computers (hereinafter represented by terminals) in which they are employed.

For this reason, there has been proposed 'down-load processing' IC cards in which processing programs may be written to the IC card the terminals corresponding to several transactions including bank transactions.

These IC cards include a rewritable non-volatile memory in an information memory portion portion for storing a processing program; and thus if the operation of an IC card is desired to be changed, its program can be rewritten.

However, such a system has the following problem. In writing or rewriting a program for the IC card belonging to the above class, the IC card has instructions dedicated to effecting a high speed transfer for programs of about 1 to 8 K bytes. In the block transfer, blocks of about 10 to 80 bytes are transferred creating a long overhead time. And also, even if the program is to be partially rewritten, the IC card is adapted so that the program has to be wholly rewritten, which takes a comparatively longer time than rewriting only the portion to be changed.

The program may include an application program and some parameters necessary for execution thereof. The parameter include constants, identification codes of the card and a user. Moreover, since a large amount of data must be transferred at a high speed in order to rewrite the program, the transfer error detection system also becomes complicated.

SUMMARY OF THE INVENTION

An object of the present invention is to provide an IC card and a method for rewriting its program in which the rewrite can be accomplished in a very short time by only transferring a divided program including a part to be rewritten.

Another object of the present invention is to provide an IC card and a method for rewriting its program in which after a program is recorded in a plurality of divided programs in a memory area, if the size of the divided programs which are objects to be newly rewritten is made larger than that before the rewriting, they can be rewritten in accordance with their corresponding memory areas.

In accordance with the present invention, a method for rewriting the program of an IC card comprises the steps of storing in a rewritable non-volatile memory a processing program to be executed in an ALU and management information for managing the area where the processing information is stored in the non-volatile memory in subareas of divisional programs which may include parameters or data; discriminating, referring to the management information in the non-volatile memory in accordance with information specifying one of the sub-areas, the sub-area corresponding to the specifying information; and writing an input program in that sub-area.

The circuits arranged in the IC card include a rewritable non-volatile memory for storing the processing program to be executed by an ALU and management information for managing the areas where the processing program is stored in sub-areas of divisional programs; and an apparatus for writing, referring to the management information in accordance with the information specifying one or plural of the sub-areas input to the ALU, input programs in the sub-area(s).

In order to manage a processing program stored in the rewritable non-volatile memory in the manner of being divided into plural programs, a region is provided for storing attribute information, including the leading address and area length of each of the sub-areas where the program parts are stored, as management information indicative of the areas. It is possible to set attribute information optionally. A processing program of any size composed of the program parts may be stored. Moreover, the above sub-areas can be optionally selected afterwards. In rewriting the processing program, it is not rewritten by transferring a whole program to an IC card but is partially rewritten to the sub-area storing the contents to be changed in the rewritable non-volatile memory, referring to the management information including the top address and area length of that sub-area previously stored in the IC card (the management information may be rewritten before writing the program parts if necessary).

In this way, in rewriting the processing program, only the program(s) which are desired to be rewritten in the processing program may be transferred to the IC card from the external device such as an IC card reader and writer, and therefore on the side of the IC card, the entire program is not required to be rewritten so that the process of rewriting the program can be more efficiently performed.

BRIEF DESCRIPTION OF THE DRAWINGS

FIG. 1 is a block diagram of the IC card according to one embodiment of the present invention;

FIG. 2a is a table showing the relationship between the entire processing program of the IC card and its divided program data parts;

FIG. 2b is a view showing the relationship between areas for storing the divided program parts and their corresponding attribute information;

FIGS. 4a, 4b and 4c are views showing the relationship between the attribute information about the program memory areas where a plurality of programs are stored, and their corresponding discrimination information; and FIG. 5 is a view for explaining one example of the communication sequence between an IC card and a terminal device.

DESCRIPTION OF THE PREFERRED EMBODIMENT

Figure 3A:
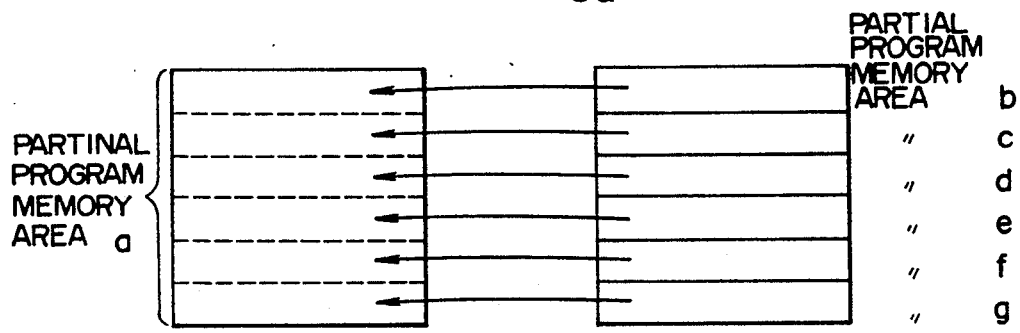
FIGS. 3a, 3b and 3c are memory maps showing several relationship between the processing program and the divided program/data parts.

As seen from FIG. 1, an IC card 1 is composed of an I/O port 2, an ALU or microprocessor unit (MPU) 3 and an information memory 5 which may be formed of a rewritable non-volatile memory such as an EPROM. The I/O port 2 includes electrical contacts (not shown) on the surface of the IC card for inputting/outputting programs and for a connecting the card to a power supply. In place of the electrical contacts, electromagnetic induction may be used for downloading the program in the IC card. The information memory 5 is composed of an application program memory section 7, an attribute information memory section 6 for storing management information for identifying the areas of the program parts into which the application program to be stored in the application program memory 7 is divided, and data memory section 8 for storing several kinds of data.

MPU 3 includes a system program memory 4 (e.g. mask ROM) for storing a system program 4a which controls the hardware functions of the IC card 1. By executing the system program 4a, MPU 3 reads and writes programs to the application program memory section 7 and controls communication with terminal devices (e.g. IC card reader/writer incorporated therein). Moreover, the MPU 3, by executing the system program 4a, writes attribute information transferred from an external device (the above terminal device) in the attribute information memory section 6 in accordance with an instruction transferred from the external device. As described later, the application program memory section 7 is managed by dividing it into a plurality of memory areas, corresponding to a plurality of program parts constituting the application program to be stored therein, in accordance with the attribute information stored in the attribute information memory section 6.

If the application program is to be down-loaded, it is executed for each of dividable program parts. For purposes described in this preferred embodiment, it is assumed that the processing program is equally divided into program parts having 32 bytes. However, the unit of division is not limited to 32 bytes and may be optionally selected.

First, the attribute information (FIG. 2a) for each of the areas storing each program part (32 bytes) received at the I/O part 2 is written in the attribute information memory section 6. Writing the attribute information is executed by activating the system program stored in the system program memory 4.

After writing the attribute information, the application program is executed in accordance with the sequence as shown in FIG. 5. First, a write instruction specific the program part area to be subjected to the write using discrimination information provided in accordance with the divided program parts, i.e. the area numbers are transferred to the IC card 1 from the terminal device (not shown). In response to the receipt of the write instruction, MPU 3 of the IC card 1 acquires, in accordance with the above discrimination information, the top address, size, etc. of the pertinent program part memory area in the application program memory section 7 from the attribute information stored in the attribute information memory section 6 and prepares the write thereof.

After completing preparation for the write, MPU 3 of the IC card 1 informs the terminal device of this fact through a data/control line 12 in accordance with the system program 4a.

Thus, the data to be written (one of the divided program parts constituting a part of the processing program, i.e. 32 bytes) is transferred from the terminal device. After receiving the write data, MPU 3 executes the writes the transferred program part (write data), in accordance with the system program 4a, in the program part memory area (32 bytes) specified by the top or leading address and the size in the application program memory section 7 of the information memory part 5 of the IC card 1. Incidentally, if the memory area is fixed to 32 bytes, the above acquisition of the size of the memory area may be omitted.

After writing one data (32 bytes), discrimination information about the subsequent program part (32 bytes) is transferred from the terminal device in the same way. In accordance with the response from the IC card 1, the program part (32 bytes) corresponding to the discrimination information is transferred from the terminal device. Then, this program part is stored in the program part memory area specified in accordance with the attribute information decided by the previously transferred discrimination information. In this way, the program parts of one processing program are sequentially stored in 32 byte portions. As a result, the entire processing program will be stored as a collection of program data parts in the application program memory section 7.

FIG. 2a shows the relationship between the entire processing program thus stored (a in FIG. 3a) and its program parts (b to g in FIG. 3a), and FIG. 2b shows the relationship between the memory areas for storing the program parts (FIG. 2b) and their attribute information (FIG. 2a). In this embodiment, as seen from FIG. 2b, the application program memory section 7 is divided into n (n:integer of 2 or more) program memory areas 7a to 7n. Stored in plural memory areas (e.g. 7a to 7h) of the respective divided memory areas 7a to 7n are the program parts through the above described write processing. In this case, the program part memory areas 7i to 7n are vacant areas reserved for rewrites. The order of writing the program parts may be optional since the write is performed in accordance with the numbers of the sub-areas, i.e. items of discrimination information.

As seen from FIG. 2a, the attribute information is stored in a table form in the attribute information memory section 6. Program area numbers are stored at the heads of the respective rows as information for discriminating the program areas for storing the program parts and, further, spaces for storing the base address and size for each row are provided.

The program area numbers, a, b, c, ... n in FIG. 2a correspond to the program part memory areas 7a, 7b, 7c, ... 7n with the same subscripts in FIG. 2b. Also, in FIG. 2a, aaaa, AA; bbbb, BB; cccc, CC; ... nnnn, NN in the respective spaces corresponding to the program area numbers a, b, c, ... n represent the base address and size thereof, respectively. The reason why both base address and size are provided is that although this is not required in the case where the application program is managed in equally divided program parts of 32 bytes, it is capable or managing a program in program parts of any size times 32 bytes.

The application program, managed in divided parts, is executed in the sequence of the above program area numbers, namely in the sequence of a, b, c, . . . ; n in this embodiment. Therefore, initially, as shown in FIG. 2b, the sequence of program area numbers a, b, c, . . . n accord with the sequence of arranging the program parts. Even if the sequence is changed by rewriting no program part, any problem occurs since the previous program area numbers are retained.

Moreover, in the case where the processing program is not to be executed in the numbering sequence of program areas, information for specifying the sequence of connecting the program parts in the respective memory areas is previously stored in the information memory section 5, or the program area number to be subsequently executed is previously stored at the end of the program part to be stored in each program area, thereby executing the application program composed of the program parts stored in the memory area of nonsequentially arranged. The sequence of executing the program parts may be stored in the attribute information memory section 6.

Now it is assumed that a shaded portion 70 of the program part 7b is desired to be rewritten. In this case, only program part 7b is identified to be rewritten, where the program parts in program areas 7a and 7c to 7n are not required to be transferred. More specifically, if the portion to be rewritten is specified from the terminal device in terms of the discrimination information referring to the attribute information corresponding to the program memory area 7b, MPU 3, as in the case of writing the application program mentioned above, searches, acquires and accesses the attribute information relative to the program part 7b, referring to the discrimination information stored in the attribute memory section 8, in response to a comparison between the description information and the attribute information, and writes the program part sent from the terminal device in the specified memory area.

Additionally, if the program part to be rewritten is smaller in size than the previous program part, the attribute information is not required to be changed since NOP is embedded in the remaining portion of the sub-area. On the other hand, if the program data to be rewritten is large in size larger than the previous program part, the overflow portion is written in a vacant area 7b'. And in executing the application program, an instruction of a jumping instruction is added to the top address (bbbb' in FIG. 2b) of the area 7b' to execute the program part therein and jump to the top address of the memory area subsequent to the area subjected to the rewrite. It is of course that the memory area of the program part to be stored in the vacant area is previously set by newly writing the attribute information thereof in the attribute information memory section 6. Otherwise, if the program part to be rewritten is larger in size than the previous program part, attribute information may be previously sent from the terminal device to register renewed base address and size for the same program area number in the attribute information memory section 6, thereby setting the area for storing in another vacant area of the information memory part 5. Then, the information in the memory area where the program part before the rewrite has been stored is cleared.

Figure 3B:
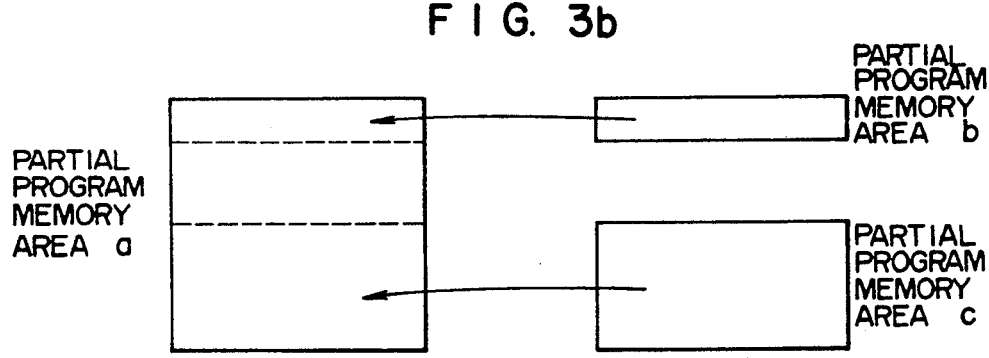
Figure 3C:
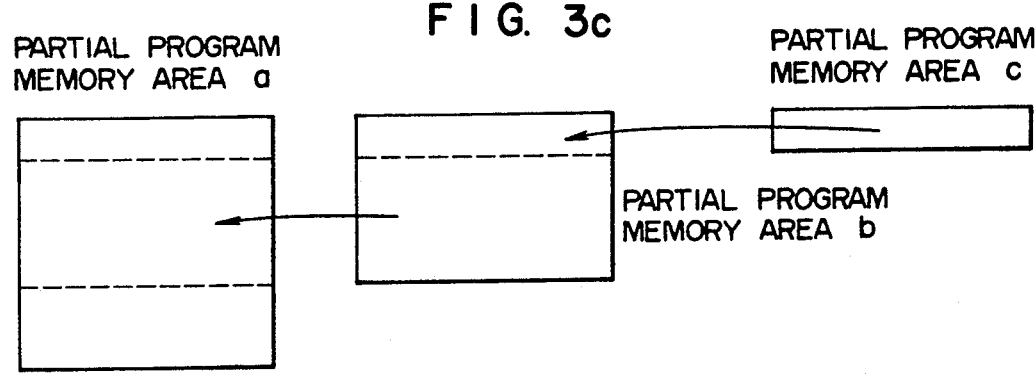

Several methods for setting program part memory areas will be explained with reference to FIGS. 3a and 3b. In these cases, the program part memory areas can be optionally provided by setting (writing) their attribute information in the table of the attribute information section 6. FIGS. 3a to 3c are all directed to the initial writing.

In the embodiment of FIG. 3a, the corresponding items of attribute information are set so that the entire application program can be stored by dividing the program into plural program parts each having a previously set information length. In initially writing the application program, the entire application program is first written in the program part memory area a. In this case, the program memory area is set to have a fixed length, regardless of the contents of the application program. In this way, the entire application program is previously stored in the program part memory area a which is the memory area for the entire application program. Thereafter, attribute information is written so that the program part a can be managed as program parts b to g by writing the corresponding program parts as indicated by arrows 32 providing for the partial change of the program.

Where the application program can be divided by sub-routines as function units, the program is stored by sub-routine in the program part memory areas. In this case, the size of the program part memory area may be set at the size necessary to store the larger sub-routines.

In the embodiment of FIG. 3b, attribute information is previously written so that the program memory area a can be set so that the program part areas b and c are rewrite areas (e.g. area for table information). The application program commonly has constants employed internally or externally; more specifically. These constants are used in the table for deciding the operation and other functions. These are indicated internally in the program and hence the specification of the program can be changed to a certain degree by rewriting them. If the table information and the constants are changed in rewriting the program, the program part memory areas may be rewritten.

FIG. 3c is directed to the case of setting an area for, table information, like FIG. 3b. In this case, the entire table information area is set as a program part memory area b. Information relative to specific controls of the table information is stored collectively in a program part memory area c. In this way, the sub-memory area can be further set so that part of the table information can be further rewritten.

In all of the above cases, if the program part to be rewritten in the program memory area a is comparatively large, a program instructing the system to jump to another program part memory area, which is a rewrite destination, is written. Thus, the execution sequence is shifted to the other program part stored in a vacant memory area of the application program memory section 7, thereby executing the entire application program.

Moreover, the application program memory is not limited to storing a single application program but different a plurality of programs may be stored therein as well. FIGS. 4a to 4c show one such an example. In this example, four application programs A, B, C and D (FIG. 4a) are stored in application program memory areas 71, 72, 73 and 74 of the application program memory section 7 (FIG. 4c). In this example, a program discrimination information section 9 is provided in the attribute information memory 6 in order to discriminate the program memory areas for storing the program parts included in each application program.

If, prior to executing the write routine, discrimination information for discriminating the application program and program part memory areas is inserted in a write instruction, it is possible to rewrite the program parts in each application program, with the same procedure and sequence as mentioned above, referring to the program discrimination information section 9 and attribute information memory section 61 (FIG. 4b). Additionally, specifying the application program in this example may be made by preparing a dedicated instruction without inserting the discrimination information in the write instruction. Moreover, if there are plural application programs, attribute information about the program may be provided for each program.

FIG. 5 shows the procedure for rewriting program parts. A terminal device specifies, using a program area number, the program part memory area corresponding to the program part to be written and issues a write instruction thereof. An IC card, after having received the write instruction, searches the specified program part memory area using the attribute information. Then, it acquires the base address and size of the pertinent program memory area for preparing to write. After completing the preparation, the IC card informs the terminal device. In response thereto, the terminal device prepares to transfer the program to be written and then transfers it to the IC card. The IC card writes the program part after the receipt thereof or concurrently with the receipt. After completing the write, the IC car informs the terminal device that the write is complete. As understood from the above description, the terminal device has only to specify the program number corresponding to the pertinent program part whereby the IC card internally tests to fine the area to be subjected to the write and the possibility of the write. The write is performed only if the IC card judges that the write can be made.

In the arrangement of the IC card shown in FIG. 1, the system program memory 4 may be provided in the information memory part 5. Moreover, the attribute information about the program part memory areas may include the end address of each program memory area in place of the base address to specify the area by adding 1 to the end address of the previous area, or by subtracting by 1 from the end address of the specified area. It may also include the end address and others in addition to the base address. Further, the attribute information should not be limited to such items, but may be, and management indicative of the reality of the program parts in the information memory part 5.

The information memory part 5 may be composed of either a single memory element or plural elements as long as the application program memory section 7 is rewritable. Moreover, although the application program was made partially rewritable in the above embodiment, it may be any program as long as it can be executed by MPU 3. Additionally, address updating in the card reader/writer for producing the program part for rewrite is ceased at the address corresponding to the end address for the program part memory area for rewrite.

I claim:

1. A method for storing, rewriting and executing a program in an IC card having an input/output port for inputting a program to be down-loaded and outputting its processing result, a main storage area for storing data and programs, and a processor for sending the program input from the input/output port to said main storage area of the IC card, and a terminal for communicating commands to said IC card through said processor, the steps of the method comprising:

dividing a first portion of said main storage area of the IC card into a plurality of subareas each having a defined memory capacity for receiving and storing parts of the program through said input/output port and said processor;

assigning a plurality of management information to identify each of said plurality of subareas including a program area number and a base address, each of said management information being stored in a second portion of said main storage area of the IC card so that the program parts are sequentially arranged in a predefined order;

dividing said program into a plurality of program parts and, thereafter, storing each of said plurality of program parts in the plurality of the subareas of said main storage area of the IC card corresponding to said management information;

selecting a program part to be rewritten by inputting management information for the program part through said terminal device for causing said processor to access the selected program part stored in a particular subarea of said main storage area of the IC card;

detecting when a selected program part to be rewritten exceeds the capacity of the subarea previously occupied by an original program part, and in response thereto automatically storing said selected program part into another vacant subarea of said plurality of subareas in said main storage of the IC card and rewritting a base address of management information corresponding to said original program part with an address of said vacant subarea;

communicating a new program part identified by said management information through said terminal device to said processor;

rewriting the selected program part with the new program part whereby the selected program part may be rewritten without rewriting the entire program; and executing sequentially said plurality of program parts in an order based on said base address included in said management information.

2. A method for rewriting a program in an IC card according to claim 1, wherein, in said selecting step, said management information includes a program area number, a base address and the total memory for each subarea.

3. A method for rewriting a program in an IC card according to claim 2, further comprising the step of detecting the end of a subarea when rewriting a program portion for updating address information.

4. A method for rewriting a program in an IC card according to claim 1, further comprising the step of when said program portion to be written exceeds the capacity of the subarea occupied by the selected program portion in said detecting step, providing from the terminal device a jump instruction to the original subarea for identifying the address of another vacant subarea in the main storage area for storing the remainder of the program part exceeding the original subarea.

5. A method for rewritting a program in an IC card according to claim 1, wherein the memory capacity of each of said subareas is fixed at 32 bytes.

6. A system for storing, rewriting and executing a program in an IC card having an input/output port for inputting a program to be down-loaded and outputting its processing result, a main storage area for storing data and programs, and a processor for sending the program input from the input/output port to said main storage area of the IC card, and a terminal for communicating commands to said IC card through said processor, the system comprising:

means for dividing a first portion of said main storage area of the IC card into a plurality of subareas each having a defined memory capacity for receiving and storing parts of the program through said input/output port and said processor;

means for assigning a plurality of management information to identify each of said plurality of subareas including a program area number and a base address, each of said management information being stored in a second portion of said main storage area of the IC card so that the program parts are sequentially arranged in a predefined order;

means for dividing said program into a plurality of program parts and, thereafter, storing each of said plurality of program parts in the plurality of the subareas of said main storage area of the IC card corresponding to said management information;

means for selecting a program part to be rewritten by inputting management information for the program part through said terminal device for causing said processor to access the selected program part stored in a particular subarea of said main storage area of the IC card;

means for detecting when a selected program part to be rewritten exceeds the capacity of the subarea previously occupied by an original program part, and in response thereto automatically storing said selected program part into another vacant subarea of said subareas in said main storage of the IC card and rewriting a base address of management information corresponding to said original program part with an address of said vacant subarea;

means for communicating a new program part identified by said management information through said terminal device to said processor;

means for rewriting the selected program part whereby the selected program part may be rewritten without rewriting the entire program; and means for executing sequentially said plurality of program parts in an order based on said management information.

7. A system for rewriting a program in an IC card according to claim 6, wherein said selecting means selects a subarea containing a program part to be rewritten on the basis of management information including a base address and the total memory for each subarea.

8. A system for rewriting a program in an IC card according to claim 7, wherein said assigning means assigns the base address of the management information as the address of the subarea to be rewritten.

9. A system for rewriting a program in an IC card according to claim 6, wherein the memory capacity of each of said subareas is fixed at 32 bytes.

* * * * *